United States Patent [19]
Yamada

[11] Patent Number: 5,928,353
[45] Date of Patent: Jul. 27, 1999

[54] CLEAR PROCESSING OF A TRANSLATION LOOKASIDE BUFFER WITH LESS WAITING TIME

[75] Inventor: Yoshihisa Yamada, Yamanashi, Japan

[73] Assignee: NEC Corporation, Tokyo, Japan

[21] Appl. No.: 08/999,621

[22] Filed: Aug. 1, 1997

Related U.S. Application Data

[63] Continuation of application No. 08/376,915, Jan. 23, 1995, abandoned.

[30] Foreign Application Priority Data

Jan. 28, 1994 [JP] Japan .................................. 6-008061

[51] Int. Cl.$^6$ ........................................................ G06F 9/30
[52] U.S. Cl. ............................................................ 712/200
[58] Field of Search ..................................... 712/200, 214

[56] References Cited

U.S. PATENT DOCUMENTS

| | | | |
|---|---|---|---|
| 4,456,954 | 6/1984 | Bullions et al. | 395/417 |
| 4,733,348 | 3/1988 | Hiraoka | 395/417 |
| 4,779,188 | 10/1988 | Gum et al. | 364/200 |
| 4,849,881 | 7/1989 | Eguichi | 395/415 |
| 5,317,705 | 5/1994 | Gannon et al. | 395/406 |
| 5,317,754 | 5/1994 | Blandy et al. | 395/800 |
| 5,428,757 | 6/1995 | Sutton | 395/415 |
| 5,500,948 | 3/1996 | Hinton et al. | 395/415 |

FOREIGN PATENT DOCUMENTS

| | | |
|---|---|---|
| 60-130995 | 7/1985 | Japan . |
| 60-254346 | 12/1985 | Japan . |
| 1109452 | 4/1989 | Japan . |
| 5250332 | 9/1993 | Japan . |

OTHER PUBLICATIONS

Patent Abstracts of Japan, vol. 013, No. 563, JP 01–234964, Dec. 14, 1989.
P. Teller, "Translation–Lookaside Buffer Consistency", Computer, vol. 23, No. 6, Jun. 1990, pp. 26–36.

*Primary Examiner*—David Y. Eng
*Attorney, Agent, or Firm*—Foley & Lardner

[57] ABSTRACT

A TLB clear control system, in a multiprocessor system including a main memory and a plurality of processors, each of which has a translation lookaside buffer (TLB), includes a decoding unit for sequentially decoding each of instructions, an instruction executing unit, a TLB clearing unit, a communication unit for communicating with the other processors, a determining unit for determining whether or not the decoded instruction is one of instructions requiring to clear or update the TLB, and an execution control unit for controlling the instruction executing unit to execute the decoded instruction when it is determined by the determining unit that the decoded instruction is not any one of instructions requiring to clear or update the TLB, and for controlling the TLB clearing unit to clear the TLB when it is determined by the determining unit that the decoded instruction is one of the instructions requiring to clear or update the TLB, for controlling the communication unit to transmit a TLB clear request, and controlling the decoding unit to decode the next instruction without waiting for TLB clear processing end notices from the other processors after the TLB clear request is transmitted when it is determined that the decoded instruction is any one of the instructions requiring to clear the TLB.

20 Claims, 10 Drawing Sheets

CLEAR PROCESSING OF A TRANSLATION LOOKASIDE BUFFER WITH LESS WAITING TIME

This application is a continuation of application Ser. No. 08/376,915, filed Jan. 23, 1995, now abandoned.

BACKGROUND OF THE INVENTION

1. Field of the Invention

The present invention relates to clear processing of a translation lookaside buffer (TLB), and more particularly, to a method and apparatus for clear processing of a TLB with less waiting time.

2. Description of the Related Art

In a conventional computer system a TLB clear control system is employed to speed up the processing. The conventional TLB clear control system of a multiprocessor system is shown in FIG. 1. The multiprocessor system includes a plurality of processors P101 to P10n, a main memory 2 and a flag F3. Each processor includes an executing section 131-i (i=1 to n) and a TLB 132-i. The flag F3 indicates that a TLB clear request is not allowed to be issued when it is set and that the TLB clear request is allowed to be issued when it is reset.

When one of the plurality of processor, for example, a processor P101 intends to execute an instruction requiring to clear its own TLB, the executing section 131-1 of the processor P101 refers to the flag F3 to see whether or not a TLB clear request is allowed to be issued. When the TLB clear request is not allowed to be issued, the executing section 131-1 waits until the flag F3 is reset, i.e., until the issuing of the TLB clear request is allowed. When the TLB clear request is allowed to be issued, the executing section 131-1 sets the flag F3 and then issues the TLB clear requests to the processors other than the issuing processor P101 in the multiprocessor system. Thereafter, the processor P101 waits for TLB clear processing end notices from all the other processors. When the executing section 131-1 receives the TLB clear processing end notices, it resets the flag F3 and then executes the above instruction.

On the other hand, the processor P101 performs the TLB clear processing for its own TLB 132-1 in response to the TLB clear request issued from another processor, after the executing section 131-1 has executed an instruction or while the processor P101 waits for the TLB clear processing end notices from the other processors for the TLB clear request issued from the processor P101. When performing the TLB clear processing, the executing section 131-1 issues a TLB clear processing end notice to the other processor which has issued the TLB clear request.

In this manner, in the conventional multiprocessor system having a plurality of processors each of which includes a TLB, there is a problem in that when a processor intends to clear the TLB for storing address translation information, after issuing a TLB clear request, the processor needs to wait for TLB clear processing end notices from all the other processors to maintain the coincidency of contents of the TLBs in all the processors.

Also, when the processor receives TLB clear requests issued by processors other than itself, the processor sequentially processes the TLB clear requests one by one. Therefore, there is another problem in that the other processors need to wait until the TLB clear requests issued from the processors are processed.

Further, the time required to perform the TLB clear processing is elongated as the number of processors in a multiprocessor system increases, resulting in the degradation of processing capability in the multiprocessor system.

SUMMARY OF THE INVENTION

The present invention has, as an object, to provide a method and apparatus for performing a TLB clear request with less waiting time.

Another object of the present invention is to provide a method and apparatus for executing instructions without waiting for TLB clear processing end notices from the other processors depending upon the processing contents of the instructions.

Further another object of the present invention is to provide a method and apparatus for performing an entire TLB clear request and a partial TLB clear request with less waiting time.

Still another object of the present invention is to provide a method and apparatus for transmitting a TLB clear request and a TLB clear processing end notice with less time.

In a first aspect of the present invention, the TLB clear control system, in a multiprocessor system including a main memory and a plurality of processors, each of which has a translation lookaside buffer (TLB), includes a decoding unit for sequentially decoding instructions, an instruction executing unit, a TLB clearing unit, a communication unit for communicating with the other processors, a determining unit for determining whether or not the decoded instruction is one of instructions requiring to clear or update the TLB, and an execution control unit for controlling the instruction executing unit to execute the decoded instruction when it is determined by the determining unit that the decoded instruction is not any one of instructions requiring to clear or update the TLB, and for controlling the TLB clearing unit to clear the TLB when it is determined by the determining unit that the decoded instruction is one of the instructions requiring to clear or update the TLB, for controlling the communication unit to transmit a TLB clear request, and controlling the decoding unit to decode the next instruction without waiting for TLB clear processing end notices from the other processors after the TLB clear request is transmitted when it is determined that the decoded instruction is any one of the instructions requiring to clear the TLB.

In another aspect of the present invention, the TLB clear control system in a multiprocessor system including a main memory and a plurality of processors, each of which includes a translation lookaside buffer (TLB), includes a decoding unit for sequentially decoding instructions, an instruction executing unit, a TLB clearing unit for clearing the TLB in response to a TLB clear command, a communication unit for communicating with the other processors, a request storage unit for storing TLB clear requests transmitted from the other processors and received by the communication unit, a storage managing unit for generating a storage state data indicating whether any TLB clear request is present in the request storage unit, for reading out the TLB clear request from the request storage unit in response to a read command, and for clearing the request storage unit in response to a storage clear command, a determining unit for determining whether or not the decoded instruction is one of instructions requiring to clear, update or refer to the TLB, and an execution control unit for controlling the instruction executing unit to execute the decoded instruction when it is determined by the determining unit that there is no TLB request in the request register, or that the decoded instruction is not one of instructions requiring to clear, update or refer to the TLB and that any TLB request is present in the request register, for issuing the read command to the storage managing unit and the TLB clear command to the TLB clearing unit to perform a TLB clear processing corresponding to the TLB request present in the request storage unit when it is determined from the storage state data that any TLB request from the other processors is present in the request register, and when it is determined by the determining unit that the decoded instruction is one of instructions requiring to clear, update or refer to the TLB, and for controlling the communication to transmit a TLB processing end notice to one of the plurality of processors requesting the TLB request after performing the processing.

In another aspect of the present invention, in a multiprocessor system including a main memory and a plurality of processors, each of which has a translation lookaside buffer (TLB), a method of executing instructions which includes instructions requiring to clear the TLBs of the plurality of processors, in a requesting one of the plurality of processors, including the steps of:

sequentially decoding each of the instructions;

performing a first determination to see whether or not the decoded instruction is one of instructions requiring to clear or update the entire TLB;

performing a second determination to see whether or not any TLB clear request from the other processors is present in a request register;

when it is determined that the decoded instruction is any one of instructions requiring to clear or update the TLB, and when it is determined that no TLB clear request from the other processors is present in a request register, performing a first operation clearing the TLB and issuing a TLB clear request to the other processors; and after issuing the TLB clear request, performing the sequentially decoding step for the next instruction when it is determined that the decoded instruction is any one of the instructions requiring only to clear the entire TLB.

When the decoded instruction is any one of instructions requiring to clear or update the TLB, and when at least one entire TLB clear request from the other processors is present in a request register, an operation may be performed for clearing the TLB to reset the request register, for issuing a TLB clear processing end notice to ones of the plurality of processors issuing the TLB clear request, and for issuing a TLB clear request to the other processors.

Also, when the decoded instruction is any one of instructions requiring to clear or update the TLB, and when any partial TLB clear request from the other processors is present in a request register without the entire TLB clear request, an operation may be performed for clearing the TLB in partial in response to each of the partial TLB clear requests to remove each partial TLB request from the request register, for issuing a TLB clear processing end notice to ones of the plurality of processors issuing the partial TLB clear requests, and for issuing a TLB clear request to the other processors.

DESCRIPTION OF THE PREFERRED EMBODIMENTS

A translation lookaside buffer (TLB) clear control system according to the present invention will be described below with reference to the accompanying drawings.

Figure 1:
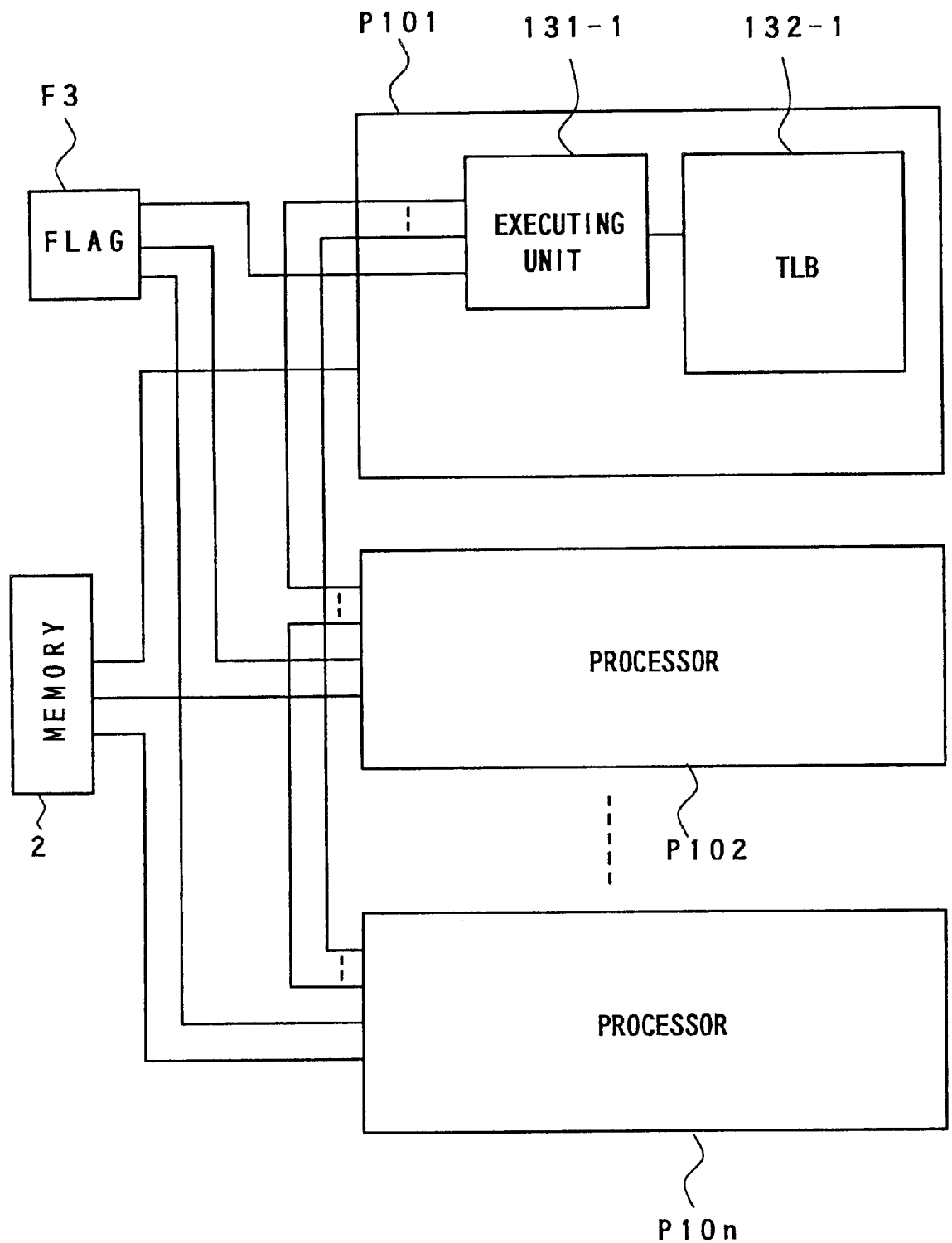
FIG. 1 is a block diagram showing a conventional translation lookaside buffer (TLB) clear control system in a multiprocessor.
Figure 2:
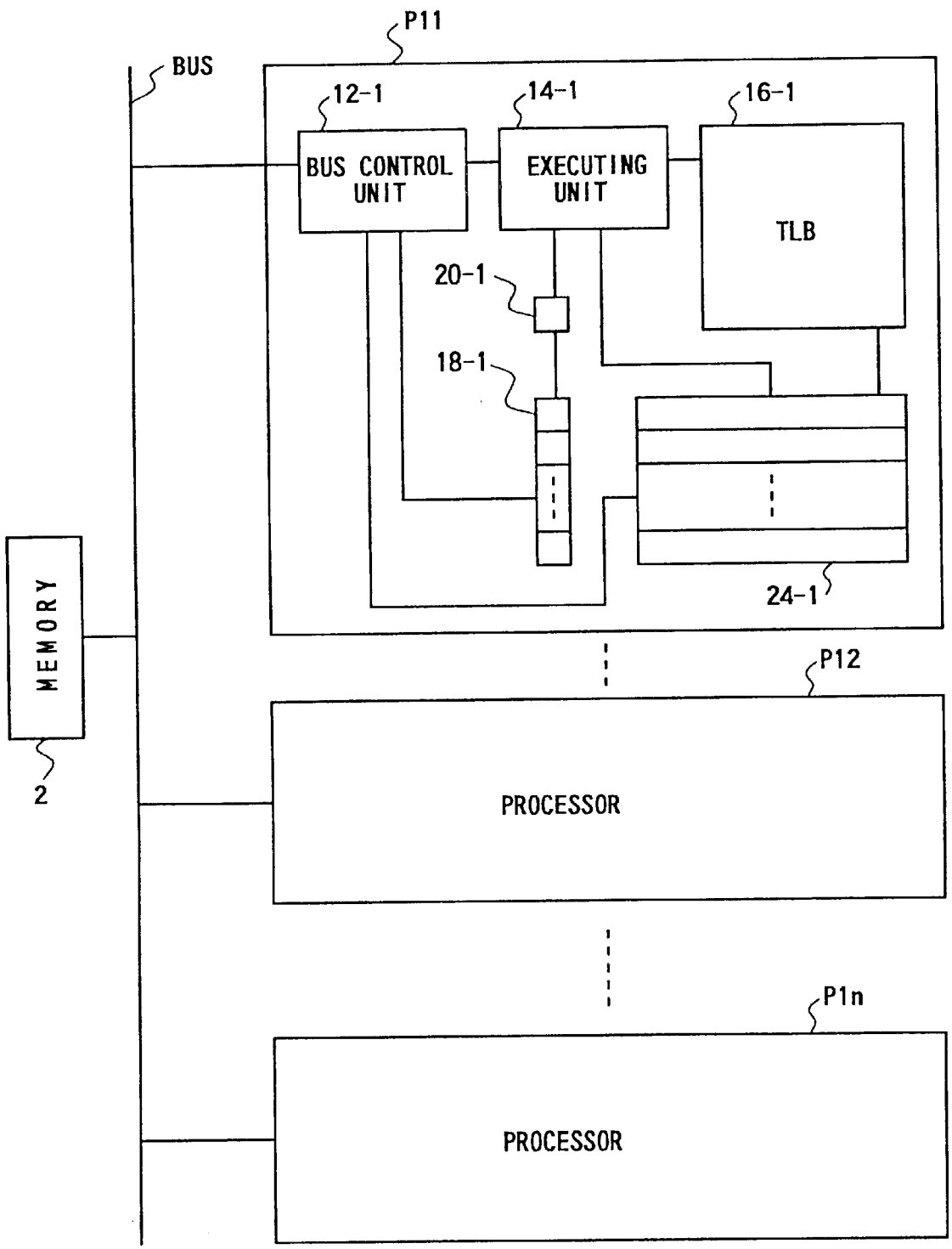
FIG. 2 is a block diagram showing a TLB clear control system in a multiprocessor system according to a first embodiment of the present invention.
Figure 3:
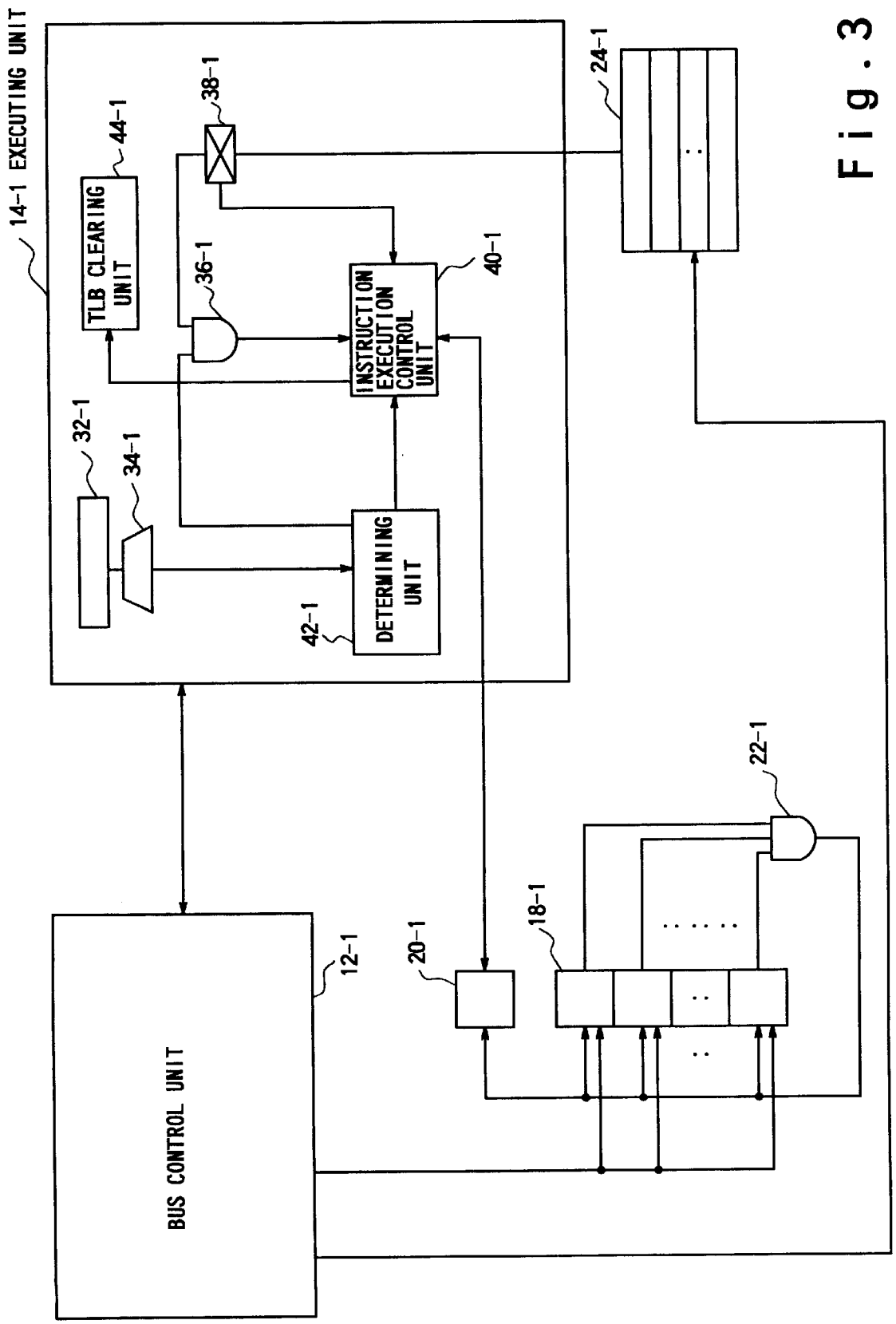
FIG. 3 is a block diagram showing the TLB clear control system of the first embodiment in a processor P11 shown in FIG. 2.

First, the TLB clear control system used in a multiprocessor system according to a first embodiment of the present invention will be described below with reference to FIGS. 2 and 3. The multiprocessor system includes a main memory 2, a plurality of processors P1i (i=1 to n), and a system bus connecting the main memory 2 and the plurality of processors P1i to each other. The system bus includes a data bus for transferring data, an address bus for transferring an address, and a control bus for transferring control signals.

Each of the plurality of the processors P1i has the same structure. Therefore, the structure of each processor will be described below taking the processor P11 as an example. Referring to FIG. 2, the processor P11 mainly includes a bus control unit 12-1, an executing unit 14-1, a translation lookaside buffer (TLB) 16-1, a set of end notice flags 18-1, a disable flag 20-1, and a request register 24-1. The end notice flags of the set 18-1 are provided for the processors P12 to P1n other than the processor P11, respectively. The detail of the processor P11 is shown in FIG. 3. The executing unit 14-1 includes an instruction register 32-1, an instruction decoder 34-1, an AND gate 36-1, a request register manager 38-1, an instruction execution control unit 40-1, a determining unit 42-1, and a TLB clearing unit 44-1. The executing unit 14-1 includes an instruction executing unit (not shown) which is well known to a person skilled in the art. The description on the instruction executing unit will be omitted but is controlled by the instruction execution control unit 40-1. The processor P11 is provided with an AND gate 22-1 to reset the set of end notice flags 18-1 and the disable flag 20-1.

The bus control unit 12-1 acquires a bus master right and transmits onto and receives from the system bus a data, a command, a request and a notice. When receiving a command for a TLB clear request, i.e., an entire TLB clear request or a partial TLB clear request from the executing unit 14-1, the bus control unit 12-1 transmits the TLB clear request to the other processors P12 to P1n and when receiving a command for a TLB clear processing end notice from the executing unit 14-1, the bus control unit 12-1 transmits the end notice to one of the processors P12 to P1n which has issued a TLB clear request. When receiving a TLB clear processing end notice from one of the processor P12 to P1n via the system bus, the bus control unit 12-1 sets one of the set of end notice flags 18-1 corresponding to the processor which has issued the end notice. When all the end notice flags 18-1 are set, the AND gate 22-1 resets the set of end notice flags 18-1 and the disable flag 20-1. When receiving the TLB clear request, the bus control unit 12-1 stores it in the request register 24-1 sequentially. A request register manager 38-1 manages the content of the request register 24-1. That is, when any TLB clear request is present in the request register 24-1, the manager 38-1 outputs a notice to the AND gate 36-1. Also, the manager 38-1 outputs the number of the entire TLB clear requests and the number of the partial TLB clear requests to the instruction execution control unit 40-1 and reads the TLB clear requests from the request register 24-1 to output them to the control unit 40-1. That is, the manager 38-1 reads out only a entire TLB clear request when the entire TLB clear request is included in the requests stored in the request register 24-1. Also, the manager 38-1 sequentially reads out partial TLB clear requests from the request register 24-1 when only the partial TLB clear requests are present in the request register 24-1 and no entire TLB clear request is present. The entire TLB clear request requests to clear the whole of TLB 16-1 and the partial TLB clear request requests to clear a part of the TLB designated by the request. Further the manager 38-1 resets the request register 24-1 entirely or partially, i.e., in response to a command issued from the instruction execution control unit 40-1. The instruction register 32-1 sequentially latches instructions as in a usual processor. This technique is well known to a person skilled in the art and therefore the detailed description will be omitted. The instruction decoder 34-1 sequentially decodes the instruction latched in the register 32-1 and outputs the decoded result to the determining unit 42-1. The determining unit 42-1 outputs a signal to the AND gate 36-1 based on the decoded result, i.e., when the decoded instruction is one of the instructions requiring to clear, update or refer to the TLB 16-1. The AND gate 36-1 outputs an interrupt signal to the instruction execution control unit 40-1 based on the signal from the determining unit 42-1 and the signal from the request register manager 38-1. Also, the determining unit 42-1 outputs to the instruction execution control unit 40-1 a signal indicating that the decoded instruction is one of the instructions requiring to clear, update or refer to the TLB 16-1.

When receiving the interrupt from the AND gate 36-1, the instruction execution control unit 40-1 checks to see if the number of the entire TLB clear requests is 0, based on the information from the manager 38-1. If the number is more than 0, the control unit 40-1 issues an entire clearing command to the TLB clearing unit 44-1 such that the unit 44-1 clears the TLB 16-1 entirely, and an entire reset command to the manager 38-1 so that the manager 38-1 resets the request register entirely without reading out any partial TLB clear request, even if present. If the number of entire TLB clear requests is 0 and the number of partial TLB clear requests is more than 0, the control unit 40-1 issues a read command to the manager 38-1. The manager 38-1 sequentially reads out the partial TLB clear requests to output them to the control unit 40-1. The control unit 40-1 issues a partial clearing command to the TLB clearing unit 44-1 based on each of the read out partial TLB clear requests so that the unit 44-1 clears the TLB 16-1 partially. Also the control unit 40-1 issues a partial reset command to the manager 38-1 so that the manager 38-1 partially resets a part of the request register corresponding to each read out partial TLB clear request. When the TLB clear processing is ended, the control unit 40-1 issues to the bus control unit 12-1 a command for issuing a TLB clear processing end notice. The unit 12-1 issues the end notice to the processor which has issued the TLB clear request. The TLB clear processing end notice includes an identifier of the processor which has issued the TLB clear request as a destination address, an identifier of the processor P11 as a source address, and data indicating that the TLB 16-1 is cleared. When the signal from the determining unit 42-1 indicates that the decoded instruction is one of instructions requiring to clear or update the TLB 16-1, the control unit 40-1 issues the entire clearing command to the TLB clearing unit 44-1. Also, the control unit 40-1 refers to the disable flag 20-1 to see whether the TLB clear request is allowed to be issued. When the disable flag 20-1 is set, the control unit 40-1 waits until the disable flag 20-1 is reset. When the disable flag 20-1 is in the reset state, the control unit 40-1 issues to the bus control unit 12-1 a command for issuing the TLB clear request. The unit 12-1 broadcasts the TLB clear request to the processor P12 to P1n. The TLB clear request includes data indicating that the request is broadcasted as a destination address, an identifier of the processor P11 as a source address, data indicating whether the request is an entire TLB clear request or a partial TLB clear request, and data indicating a region to be cleared when the request is the partial TLB clear request.

Next, the operation of the TLB clear control system according to the first embodiment of the present invention will be described below with reference to FIGS. 4 to 6.

Figure 6:
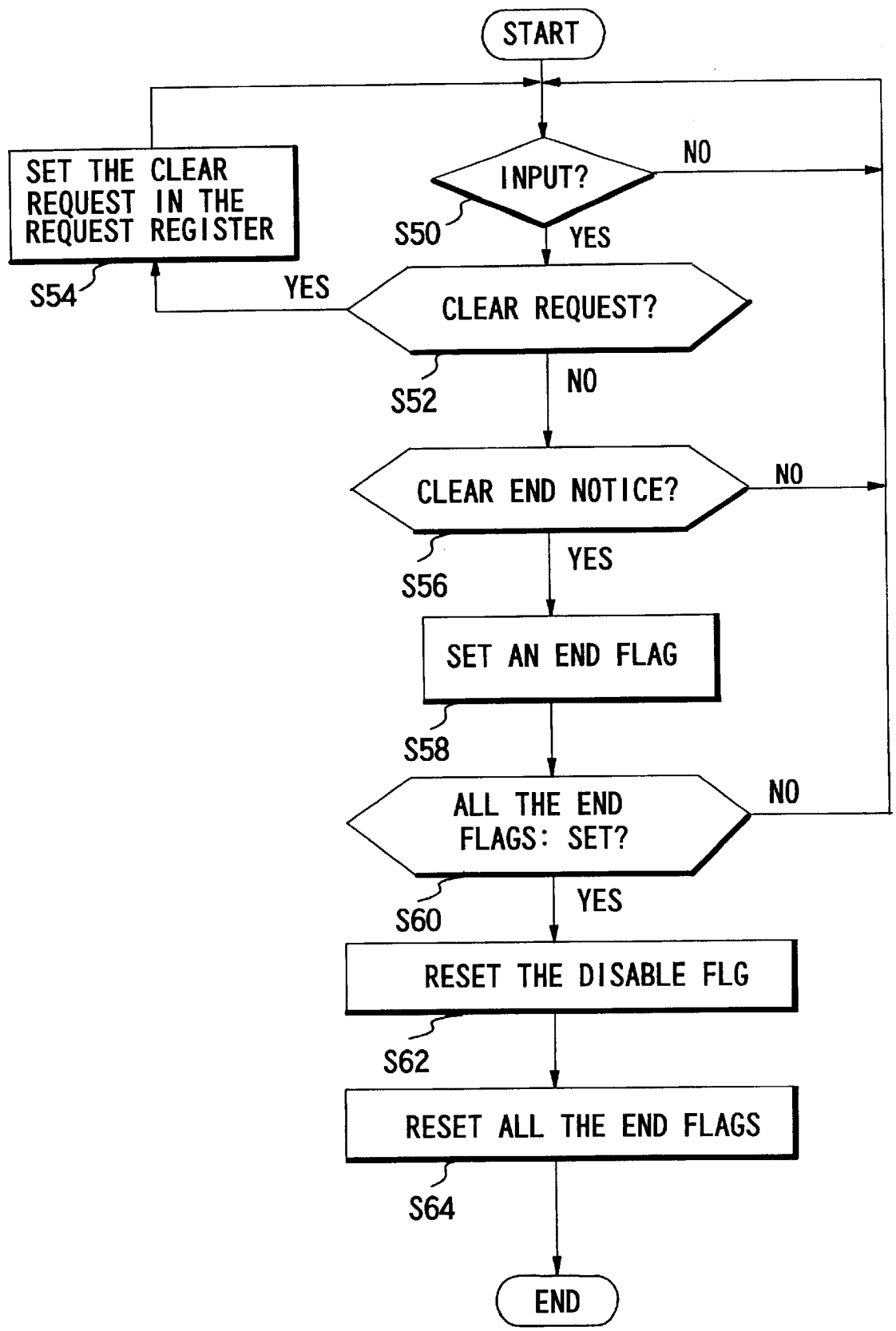
FIG. 6 is a flow chart for explaining the operation of the TLB clear control system of the first embodiment when a TLB clear request is received from another processor and a TLB clear processing end notice is received.
Figure 7:
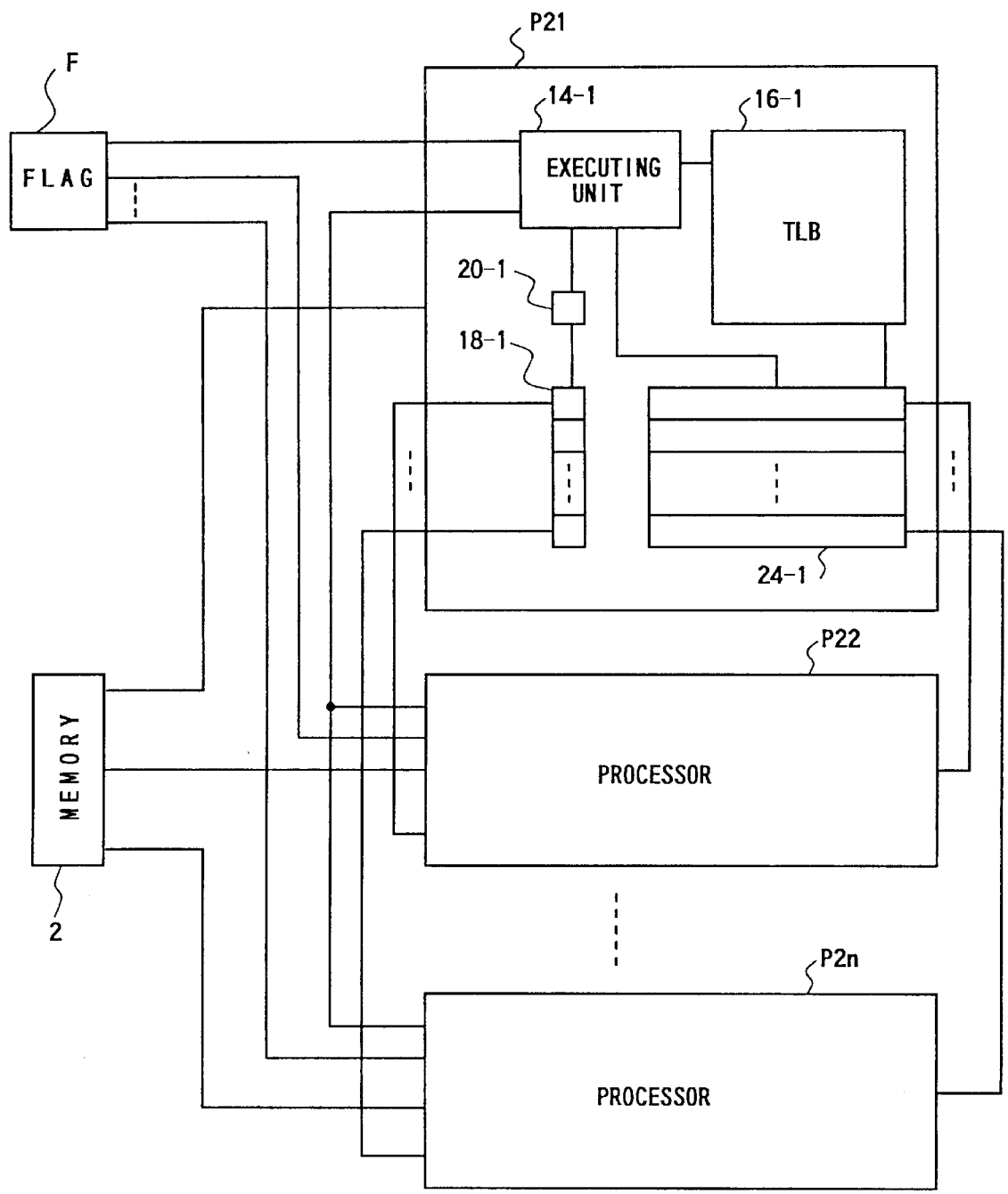
FIG. 7 is a block diagram showing the TLB clear control system in a multiprocessor system according to a second embodiment of the present invention.

First, referring to FIG. 6, the bus control unit checks whether there is any input, in a step S50. When there is any input, it is checked in a step S52 to see whether or not the input is TLB clear request. If the answer is affirmative in the step S52, the bus control unit 12-1 stores the TLB clear request in the request register 24-1 in a step S54. If the answer is negative in the step S52, a step S56 is executed to see whether or not the input is a TLB clear processing end notice. If the answer is negative in the step S56, the control returns to the step S50. If the answer is affirmative in the step S56, the control proceeds to a step S58 where the bus control unit 12-1 sets one of the set of end notice flags 18-1 corresponding to the processor which has issued the end notice, based on the source address in the end notice. In a step S60, it is checked to see whether or not all the end notice flags are set. If the answer is negative in the step S60, the control returns to the step S50 to wait for the other TLB clear processing end notices. If the answer is affirmative in the step S60, the AND gate 22-1 resets the set of end notice flags 18-1 and the disable flag 20-1 in steps S62 and S64.

Figure 4:
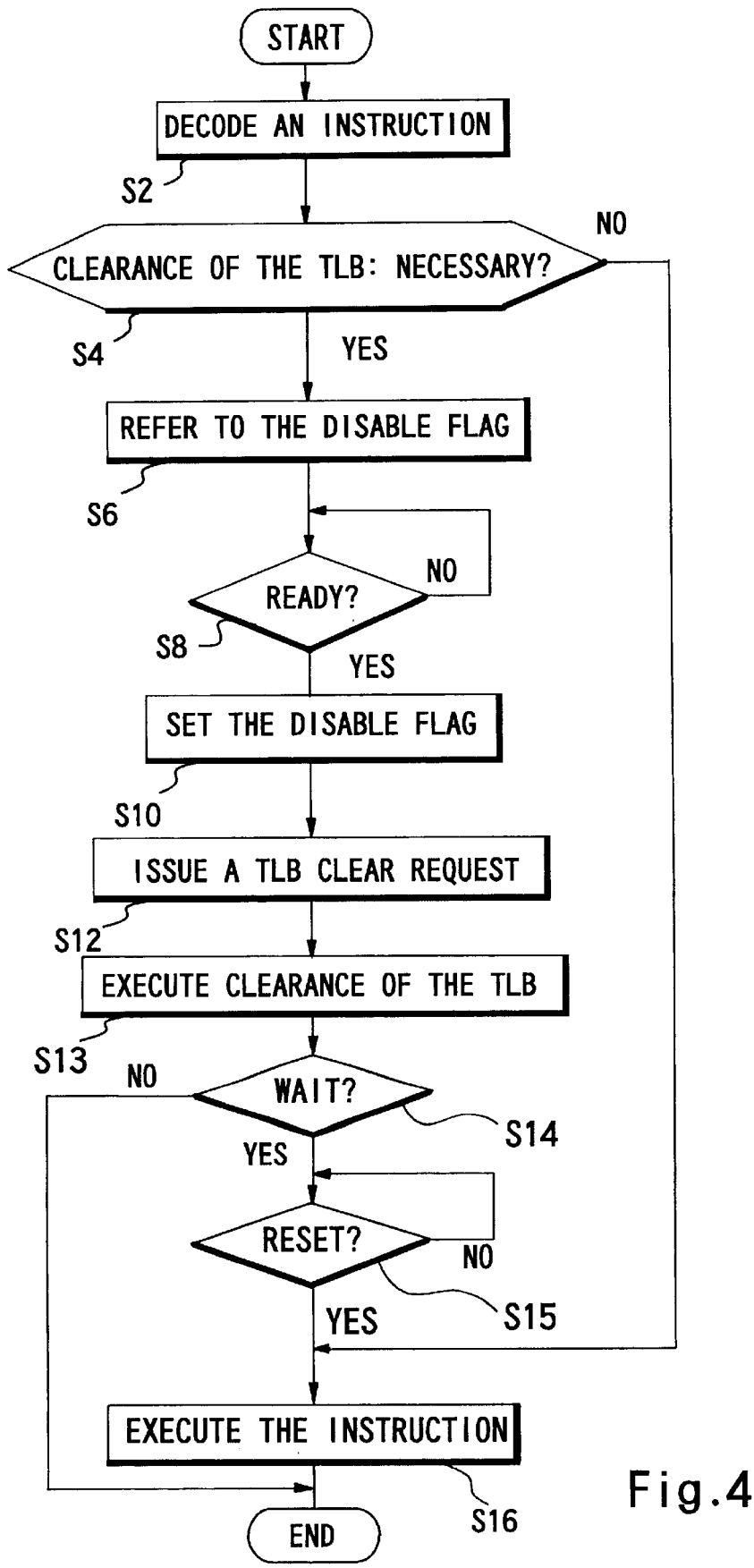
FIG. 4 is a flow chart for explaining the operation of the TLB clear control system of the first embodiment when a TLB clear request is issued.
Figure 5:
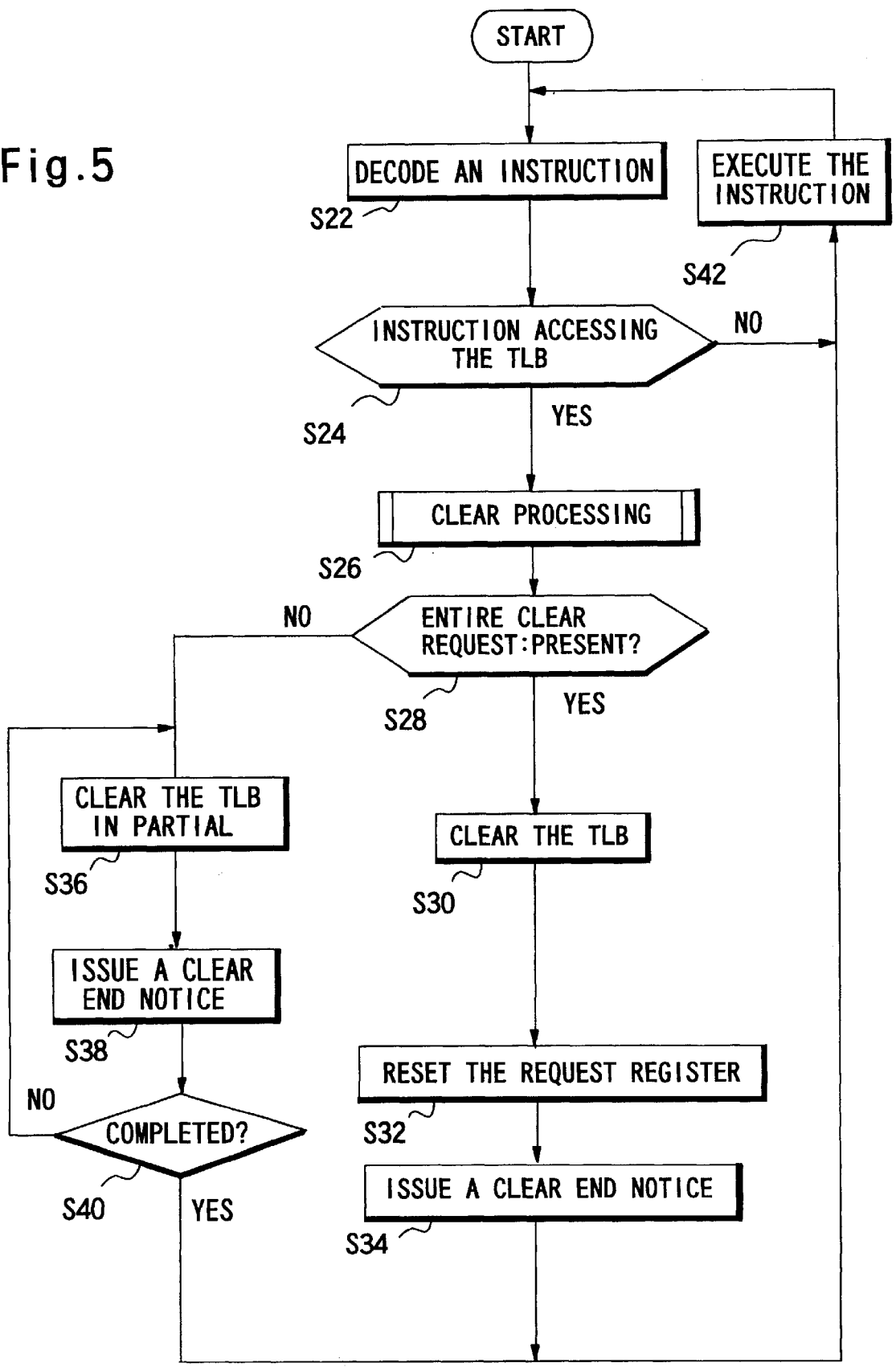
FIG. 5 is a flow chart for explaining the operation of the TLB clear control system of the first embodiment when TLB clear requests received from the other processors are processed.

Next, referring to FIG. 4, in a step S2 the instruction register 32-1 latches an instruction and the instruction decoder 34-1 decodes the instruction latched in the register 32-1. In a step S4, the determining unit 42-1 determines whether the instruction is one of the instructions requiring to clear or update the TLB 16-1. If the answer is negative in the step S4, the control goes to a step S16. If the answer is affirmative in the step S4, the instruction execution control unit 40-1 refers to the disable flag 20-1 to see whether the disable flag 20-1 is reset or set, i.e., the transmission is ready. In a step S8, the control unit 40-1 waits until the transmission becomes ready, i.e., the disable flag is reset. If the answer is affirmative in the step S8, the control unit 40-1 sets the disable flag 20-1 in a step S10 to prevent another TLB clear request from being issued from the processor P11. Then the control unit 40-1 issues a command for a TLB clear request to the bus control unit 12-1 in a step S12 and the control unit 12-1 broadcasts the TLB clear request to the processors P12 to P1n via the system bus. In a step S13, the instruction execution control unit 40-1 issues an entire clearing command to the TLB clearing unit 44-1 which clears the TLB 16-1 entirely. Subsequently, the control unit 40-1 determines based on the information from the determining unit 42-1 in a step S14 whether or not the waiting operation is necessary, i.e., whether or not the decoded instruction is an instruction requiring any processing after the clearance of the TLBs of the other processors P12 to P1n are completed. If the answer is negative in the step S14, the control ends and the control unit 40-1 starts the processing for the next instruction. If the answer is affirmative in the step S14, the control unit 40-1 awaits in a step S15 that the disable flag 20-1 is reset by the end notices for the issued TLB clear request from the other processors P12 to P1n. When the disable flag is reset in the step S15, the step S16 is executed such that the control unit 40-1 controls the instruction executing unit (not shown) to execute the decoded instruction. It should be noted that when a TLB clear instruction accompanied with the coincidence processing of a cache is to be executed, the instruction is executed to keep a correct order of the TLB clear processing and the coincidence processing of cache before and after the execution of the instruction.

Next, the operation of the TLB clear control system when the TLB clear request is stored will be described below with reference to FIG. 5. Referring to FIG. 5, in a step 22 the instruction register 32-1 latches an instruction and the instruction decoder 34-1 decodes the instruction latched in the register 32-1. In a step S24, the determining unit 42-1 determines whether the instruction is one of the instructions requiring to clear, update or refer to the TLB 16-1. If the answer is negative in the step S24, the control goes to a step S42 where the control unit 40-1 controls the instruction executing unit (not shown) to execute the decoded instruction. If the answer is affirmative in the step S24, the TLB clear processing is performed. In the TLB clear processing, the instruction execution control unit 40-1 determines from the information from the request register manager 38-1 whether or not at least one entire TLB clear instruction is present in the request register 24-1. If the answer is affirmative in the step S28, the control unit 40-1 issues a entire TLB clearing command to the TLB clearing unit 44-1 which clears the TLB 16-1 in a step S30. Then the control unit 40-1 issues in a step S32 a command to the manager 38-1 which resets the request register 24-1 entirely in response to the command. Subsequently, the control unit 40-1 issues in a step S34 a command to the bus control unit 12-1 which broadcasts the TLB clear processing end notice. When receiving the broadcasted end notice, the processors P12 to P1n set the corresponding end notice flags in the sets 18-2 to 18-n. Thereafter the control goes to the step S42. That is, when at least one entire TLB clear request is stored in the request register 24-1, only the TLB clear processing is performed regardless of the partial TLB clear requests stored in the register 24-1.

If the answer is negative in the step S28, the control unit 40-1 issues in a step S36 a read command to the manager 38-1 which reads out one partial TLB clear request from the request register 24-1. The control unit 40-1 issues a partial TLB clearing command to the TLB clearing unit 44-1 based on the read out partial TLB clear request and the unit 44-1 clears the TLB 16-1 in partial. In a step S38, the control unit issues a command to the bus control unit 12-1 which transmits the TLB clear processing end notice to the processor which has issued the read out partial TLB clear request in response to the command. In a step S40, it is determined whether all partial TLB clear requests have been completed. If the answer is a negative in the step S40, another partial TLB clear request is read out in the step S36. If the answer is affirmative in the step S40, the control goes to the step S42.

Next, the TLB clear control system according to the second embodiment of the present invention will be described with reference to FIGS. 7 to 9B. First, referring to FIG. 7, the system bus is not provided and a flag F is further provided to indicate the transmitting state of request or notice. A plurality of processors P21 to P2n in a multiprocessor system are connected to each other and each processor P2i (i=1 to n) is not provided with the bus control unit, unlike the first embodiment. The executing unit 14-1 checks the flag F to see whether or not the transmitting is allowed and sets the flag F when the transmitting is allowed, to transmit the request or notice. The executing unit 14-1 is connected to the end notice flags of the sets 18-2 to 18-n corresponding to the processor P21 and transmits the end notice to the processor which has issued the TLB clear request, that is, sets the end notice flag in the processor which has issued the TLB clear request. Also, after the transmitting is allowed, the executing unit 14-1 writes a TLB clear request in a part of the request register 24-1 of the other processor P2i corresponding to the processor P21. The other structure of the processor P2i is the same as the processor P1i in the first embodiment and therefore the description will be omitted.

Figure 9A:
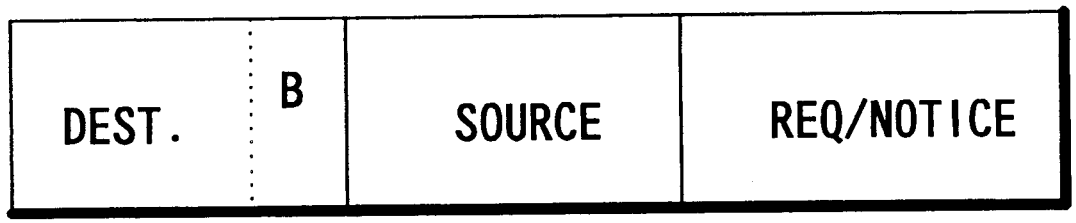
FIGS. 9A and 9B are diagrams showing the formats of a TLB clear request and notice.
Figure 9B:
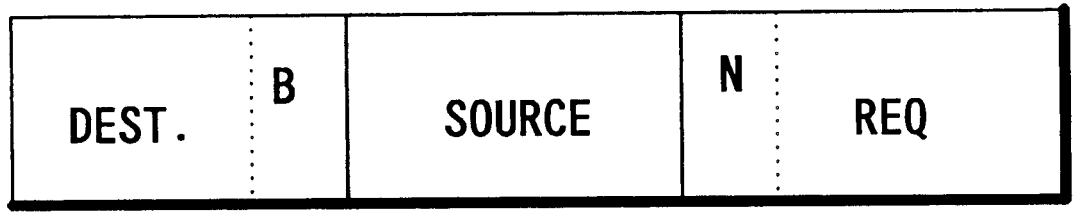

Referring to FIGS. 9A and 9B, the formats of the TLB clear request and TLB clear processing end notice will be described. In FIG. 9A, the request or notice has a destination field for storing a destination address, a source field for storing a source address, and a request/end notice field. The destination field is provided with a subfield of one bit indicative of broadcasting. This format is used for transmitting the request or end notice. Referring to FIG. 9B, the request or notice has a destination field for storing a destination address, a source field for storing a source address, and a request field. The destination field is provided with a subfield of one bit indicative of broadcasting and the request field is provided with a subfield of one bit indicative of the end notice. This format is used for transmitting the request with the end notice when the TLB clear request is stored in the request register 24-1 and the TLB clear request is issued from the processor P21.

Figure 8A:
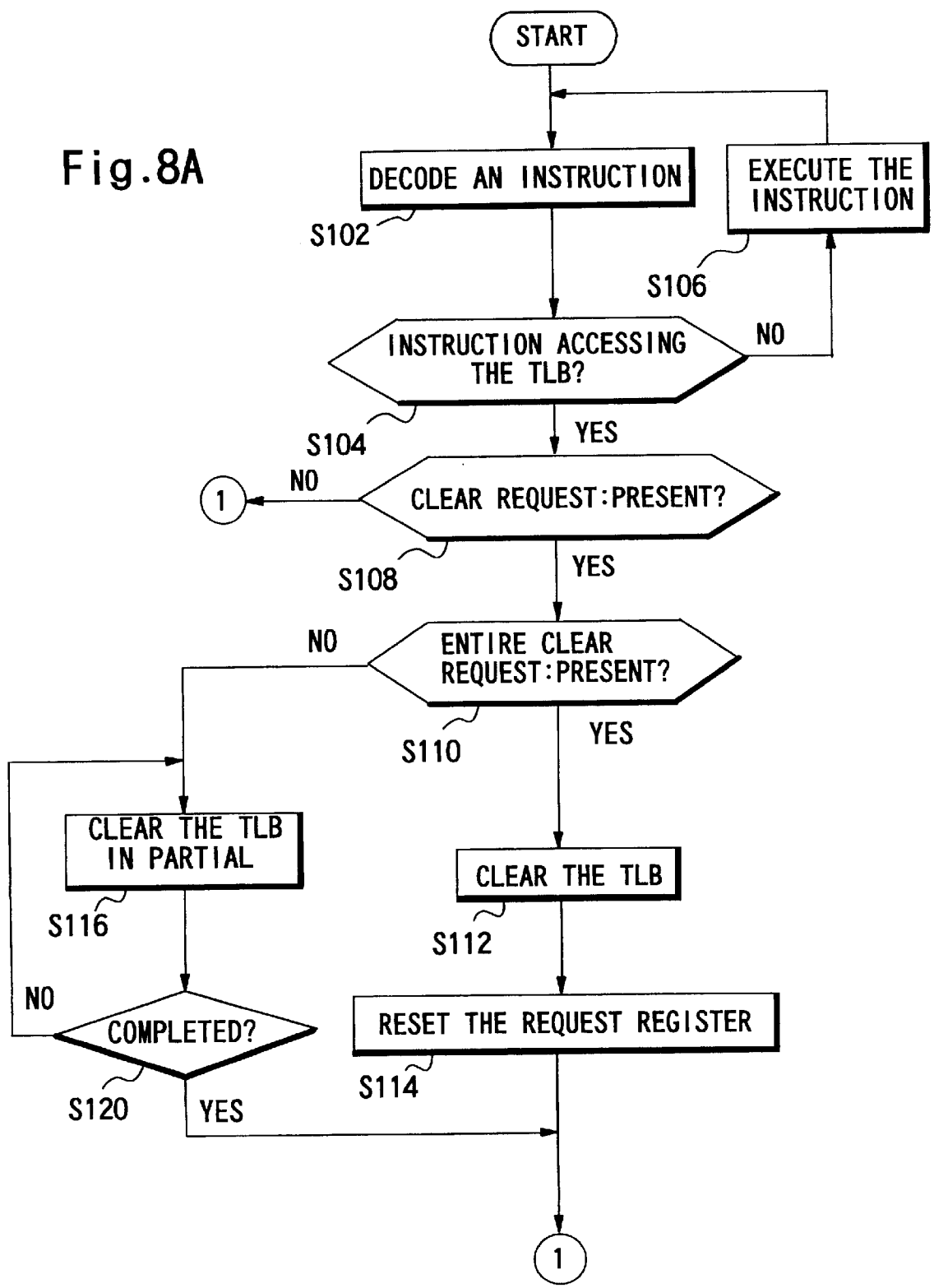
FIGS. 8A and 8B are flow charts showing the operation of the TLB clear control system in a multiprocessor system according to the second embodiment of the present invention.

Next, the operation of the TLB clear control system will be described below with reference to FIGS. 8A and 8B. Referring to FIG. 8A, in a step S102 the instruction register 32-1 latches an instruction and the instruction decoder 34-1 decodes the instruction latched in the register 32-1. In a step S104, the determining unit 42-1 determines whether the instruction is one of the instructions requiring to clear, update or refer to the TLB 16-1. If the answer is negative in the step S104, the control goes to a step S106 where the control unit 40-1 controls the instruction executing unit (not shown) to execute the decoded instruction. If the answer is affirmative in the step S104, it is determined in a step S108 whether or not any TLB clear request is stored in the request register or buffer 24-1. If the answer is negative in the step S108, the control goes to a step S122. If the answer is affirmative in the step S108, a step S110 is executed where the instruction execution control unit 40-1 determines from the information from the request register manager 38-1 whether or not at least one entire TLB clear instruction is present in the request register 24-1. If the answer is affirmative in the step S110, the control unit 40-1 issues a entire TLB clearing command to the TLB clearing unit 44-1 which clears the TLB 16-1 in a step S112. Then the control unit 40-1 issues in a step S114 a command to the manager 38-1 which resets the request register 24-1 entirely in response to the command. If the answer is negative in the step S110, the control unit 40-1 issues in a step S116 a read command to the manager 38-1 which reads out one partial TLB clear request from the request register 24-1. The control unit 40-1 issues a partial TLB clearing command to the TLB clearing unit 44-1 based on the read out partial TLB clear request and the unit 44-1 clears the TLB 16-1 in partial. In a step S120, it is determined whether all partial TLB clear requests have been completed. If the answer is negative in the step S120, another partial TLB clear request is read out in the step S116. If the answer is affirmative in the step S120, the control goes to the step S122.

Figure 8B:
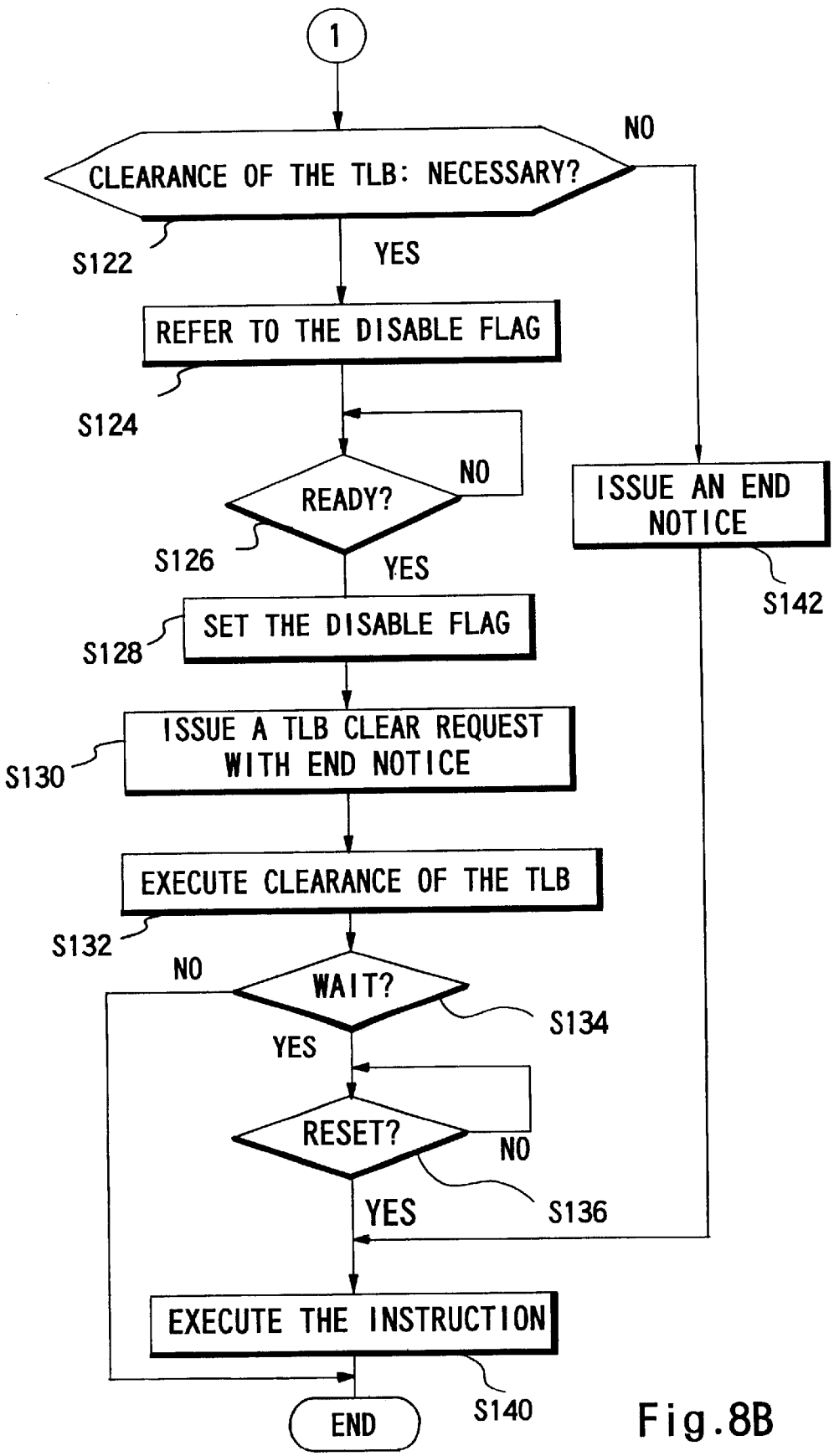

Next, referring to FIG. 8B, in a step S122, the determining unit 42-1 determines whether the instruction is one of the instructions requiring to clear or update the TLB 16-1. If the answer is negative in the step S122, a step S142 is executed such that the executing unit 14-1 refers to the flag F and sets the flag F if the flag F is not set. If the flag F is set, the executing unit 14-1 waits until the flag F is reset. Then the executing unit 14-1 transmits the TLB clear processing end notice to the processor which has issued the TLB clear request, using the format shown in FIG. 9A. If the answer is affirmative in the step S122, in a step S124 the instruction execution control unit 40-1 refers to the disable flag 20-1 to see whether the disable flag 20-1 is reset or set, i.e., the transmission is ready. In a step S126, the control unit 40-1 waits until the transmission becomes ready, i.e., the disable flag is reset. Then, the executing unit 14-1 refers to the flag F and sets the flag F if the flag F is not set. If the flag F is set, the executing unit 14-1 waits until the flag F is reset. If the answer is affirmative in the step S126, the control unit 40-1 sets the disable flag 20-1 in a step S128 to prevent another TLB clear request from being issued from the processor P21. Then the executing unit 14-1 broadcasts the TLB clear request to the processors P22 to P2n in a step S130. In this case, if the TLB clear processing is performed in the step S112 or S116, the TLB clear command is with an end notice, using the format shown in FIG. 9B. Thereby, the end notice flag is set in the processor which has issued the TLB clear request, while the end notice bit is neglected in the processor having issued no TLB clear request. In a step S132, the instruction execution control unit 40-1 issues an entire clearing command to the TLB clearing unit 44-1 to clear the TLB 16-1 entirely unless the TLB 16-1 is not cleared in the steps 110 to 120. Subsequently, the control unit 40-1 determines based on the information from the determining unit 42-1 in a step S134 whether or not the waiting operation is necessary, i.e., whether or not the decoded instruction is an instruction requiring any processing after the clearance of the TLBs of the other processors P22 to P2n is completed. If the answer is negative in the step S134, the control ends and the control unit 40-1 starts the processing for the next instruction. If the answer is affirmative in the step S134, the control unit 40-1 awaits in a step S136 that the disable flag 20-1 is reset by the end notices for the issued TLB clear request from the other processors P12 to P1n. When the disable flag is reset in the step S136, the step S140 is executed such that the control unit 40-1 controls the instruction executing unit (not shown) to execute the decoded instruction. Thereafter, the processing for the next instruction is started.

As described above, according to the TLB clear control system in a multiprocessor system according to the present invention, when a processor issues a TLB clear request, the processor can occasionally execute a next instruction without waiting for the TLB clear processing end notices from the other processors. Therefore, the TLB processing can be performed faster than a conventional TLB clear control system. In this case, the processor does not erroneously issues the TLB clear request double because the disable flag is provided. In addition, because each processor can hold the TLB clear requests from the other processors, the time required for the TLB clear processing can be further shortened in the whole multiprocessor system.

What is claimed is:

1. A multiprocessor system including a main memory and a plurality of processors, each of which has a translation lookaside buffer (TLB), a method of executing instructions which includes instructions requiring to clear or update the TLBs of the plurality of processors, in a requesting one of the plurality of processors, said method comprising the steps of:

sequentially decoding each of the instructions including a decoded current instruction;

determining whether or not the decoded current instruction is one of the instructions requiring to clear or update the TLBs of the plurality of processors;

executing the decoded current instruction by the requesting processor when it is determined that the decoded current instruction is not any one of the instructions requiring to clear or update the TLBs of the plurality of processors;

when it is determined that the decoded current instruction is one of the instructions requiring to clear or update the TLBs of the plurality of processors, issuing a current TLB clear request from the requesting processor to ones of the plurality of processors other than the requesting processor regardless of whether or not a processing for a TLB clear request previously received from another of the plurality of processors is complete;

clearing the TLB of the requesting processor by the requesting processor;

determining whether or not TLB clear processing end notices for a previously issued TLB clear request, issued previous to the current TLB clear request, have already been received from the other processors when it is determined that a previously decoded instruction, previous to the decoded current instruction, in said decoding step was one of the instructions requiring to clear the TLBs of the plurality of processors;

waiting for the TLB clear processing end notices for the previously issued TLB clear request from the other processors when it is determined that all of the TLB clear processing end notices for the previously issued TLB clear request are not received from the other processors; and issuing another TLB clear request to the other processors when it is determined that the TLB clear processing end notices for the previously issued TLB clear request are not received from the other processors.

2. A method according to claim 1, further comprising the steps of:

performing said decoding step for a next instruction, next to the decoded current information, when it is determined that the previously decoded instruction is any one of the instructions requiring to clear the TLBs of the plurality of processors; and executing the decoded next instruction after the TLB clear processing end notices are received from the other processors when it is determined that the decoded next instruction is one of the instructions requiring to update the TLBs of the plurality of processors.

3. A method according to claim 1, wherein each of said issuing steps includes setting a disable flag, and wherein said step of determining whether or not the TLB clear processing end notices are already received includes the steps of:

each time the TLB clear processing end notice is received, setting a notice receiving flag corresponding to the processor having issued the TLB clear processing end notice;

resetting the disable flag when all of the TLB clear processing end notices are received from the other processors and all the notice receiving flags are set; and referring to the disable flag to determine whether or not the TLB clear processing end notices for the previously issued TLB clear request are already received from the other processors.

4. In a multiprocessor system including a main memory and a plurality of processors, each of which includes a translation lookaside buffer (TLB), a method of execution of instructions in each of the plurality of processors, comprising the steps of:

decoding each of the instructions, including a decoded current instruction, by said each processor;

performing a first determination of whether the decoded current instruction is one of the instructions requiring to clear or update the TLBs of the plurality of processors or refer to the TLB of said each processor;

executing the decoded current instruction when it is determined, in said first determination, that the decoded instruction is not one of the instructions requiring to clear or update the TLBs of the plurality of processors or refer to the TLB of said each processor;

when it is determined, in said first determination, that the decoded current instruction is one of the instructions requiring to clear or update the TLBs of the plurality of processors or refer to the TLB of said each processor, performing a second determination of whether or not a TLB request from another of the plurality of processors is present in a request register of said each processor;

executing the decoded current instruction when it is determined, in said second determination, that there is no TLB request in the request register;

when it is determined, in said second determination, that the TLB request from the other processor is present in the request register, performing a processing corresponding to the TLB request present in the request register, by said each processor; and issuing a TLB processing end notice to the other processor after performing the processing.

5. A method according to claim 4, wherein said step of performing said second determination comprises the steps of:

determining if there is a partial TLB clear request in the request register; and determining if there is an entire TLB clear request in the request register.

6. A method according to claim 5, wherein said step of performing said processing includes the steps of:

clearing the entire TLB of said each processor and resetting the request register of said each processor when it is determined that there is at least one entire TLB clear request in the request register; and sequentially and partially clearing the TLB of said each processor and removing the partial TLB clear requests from the request register when it is determined that there are one or more partial TLB clear requests in the request register but there is no entire TLB clear request.

7. In a multiprocessor system including a main memory and a plurality of processors, each of which has a translation lookaside buffer (TLB), a method of executing instructions which includes instructions requiring to clear or update the TLBs of the plurality of processors, in a requesting one of the plurality of processors, said method comprising the steps of:

sequentially decoding each of the instructions;

performing a first determination of whether or not the decoded instruction is one of the instructions requiring to clear or update all of each of the TLBs of the plurality of processors;

performing a second determination of whether or not a TLB clear request from the other processors is present in a request register;

when it is determined that the decoded instruction is any one of instructions requiring to clear or update the TLBS, and when it is determined that no TLB clear request from the other processors is present in the request register, performing a first operation of clearing the TLB of the requesting processor and issuing a TLB clear request to the other processors, by the requesting processor; and after issuing the TLB clear request, performing said sequentially decoding step for a next instruction, next to the decoded instruction, without waiting for TLB clear end notices from the other processors, when it is determined that the decoded instruction does not require any processing after the clearance of the TLBs of the other processors.

8. A method according to claim 7, further comprising the step of:

executing the decoded instruction when it is determined that the decoded instruction is not any one of instructions requiring to clear or update the TLBs, and when it is determined that no TLB clear request from the other processors is present in the request register.

9. A method according to claim 7, further comprising the steps of:

before performing said first operation, performing a third determination of whether or not at least one entire TLB clear request is present in the request register; and when it is determined that the decoded instruction is any one of instructions requiring to clear or update the TLBs, and when it is determined that at least one entire TLB clear request from the other processors is present in the request register, performing a second operation instead of said first operation, said second operation including clearing the TLB of the requesting processor and resetting the request register of the requesting processor, issuing a TLB clear processing end notice to ones of the plurality of processors corresponding to each TLB clear request present in the request register, and issuing a TLB clear request to the other processors.

10. A method according to claim 7, further comprising the steps of:

before performing said first operation, performing a third determination of whether or not at least one entire TLB clear request is present in the request register; and when it is determined that the decoded instruction is any one of instructions requiring to clear or update the TLBs, and when it is determined that at least one entire TLB clear request from the other processors is present in the request register, performing a second operation instead of said first operation, said second operation including clearing the TLB of the requesting processor and resetting the request register of the requesting processor and issuing to the other processors a TLB clear request together with a TLB clear processing end notice.

11. A method according to claim 7, wherein said step of performing said first determination further includes the step of performing a third determination of whether or not the decoded instruction is one of the instructions requiring to refer to the TLB of the requesting processor, and wherein said method further comprises the step of:
when it is determined that the decoded instruction is any one of the instructions requiring to refer to the TLB of the requesting processor, and when it is determined that any TLB clear request from the other processors is present in the request register, performing a third operation of clearing the TLB and resetting the request register and issuing a TLB clear processing end notice to ones of the plurality of processors corresponding to each TLB clear request in the request register.

12. A method according to claim 7, further comprising the steps of:
before performing said first operation, performing a third determination of whether or not at least one partial TLB clear request is present in the request register; and
when it is determined that the decoded instruction is any one of instructions requiring to clear or update the TLBs, and when it is determined from the second and third determinations that any partial TLB clear request from the other processors is present in the request register without an entire TLB clear request, performing a fourth operation instead of said first operation, said fourth operation including clearing a portion of the TLB of the requesting processor in response to each of the partial TLB clear requests and removing each partial TLB request from the request register, issuing a TLB clear processing end notice to ones of the plurality of processors corresponding to each of the partial TLB clear requests, and issuing a TLB clear request to the other processors.

13. A method according to claim 7, further comprising the steps of:
before performing said first operation, performing a third determination of whether or not at least one partial TLB clear request is present in the request register; and
when it is determined that the decoded instruction is any one of instructions requiring to clear or update the TLBS, and when it is determined from the second and third determinations that any partial TLB clear request from the other processors is present in the request register without an entire TLB clear request, performing a fourth operation instead of said first operation, said fourth operation including clearing a portion of the TLB of the requesting processor in response to each of the partial TLB clear requests and removing each partial TLB request from the request register, and issuing to the other processors a TLB clear request together with a TLB clear processing end notice.

14. A method according to claim 7, further comprising the step of:
executing the decoded instruction after the TLB clear processing end notices are received from the other processors when it is determined that the decoded instruction is one of the instructions requiring to update the TLB of the requesting processor.

15. A method according to claim 7, further comprising the steps of:
determining whether or not TLB clear processing end notices for a previously issued TLB clear request have already been received from the other processors when it is determined that a previously decoded instruction, previous to the decoded instruction, in said decoding step was one of the instructions requiring to update the TLBs;
waiting for the TLB clear processing end notices for the previously issued TLB clear request, previous to the TLB clear request, from the other processors when it is determined that all of the TLB clear processing end notices for the previously issued TLB clear request are not received from the other processors; and
issuing another TLB clear request to the other processors when it is determined that the TLB clear processing end notices for the previously issued TLB clear request are received from the other processors.

16. A method according to claim 15, wherein each of said step of performing said first operation includes setting a disable flag, and
wherein said step of determining whether or not the TLB clear processing end notices are already received includes the steps of:
each time the TLB clear processing end notice is received, setting a notice receiving flag corresponding to the processor having issued the TLB clear processing end notice;
resetting the disable flag when all of the TLB clear processing end notices are received from the other processors and all the notice receiving flags are set; and
referring to the disable flag to determine whether or not the TLB clear processing end notices for the previously issued TLB clear request are already received from the other processors.

17. In a multiprocessor system including a main memory and a plurality of processors, each of which has a translation lookaside buffer (TLB), a TLB clear control system comprising:
decoding means for sequentially decoding instructions;
an instruction executing unit;
a TLB clearing unit;
a communication unit for communicating with the other processors;
determining means for determining whether or not the decoded instruction is one of the instructions requiring to clear or update the TLBs of the plurality of processors; and
execution control means for controlling said instruction executing unit to execute the decoded instruction when it is determined by said determining means that the decoded instruction is not any one of the instructions requiring to clear or update the TLBs, and for controlling said TLB clearing unit to clear the TLB of said TLB clear control system when it is determined by said determining means that the decoded instruction is one of the instructions requiring to clear or update the TLBs, for controlling said communication unit to transmit a TLB clear request, and controlling said decoding means to decode the next instruction without waiting for TLB clear processing end notices from the other processors after the TLB clear request is transmitted when it is determined that the decoded instruction is any one of the instructions requiring to clear the TLB.

18. A system according to claim 17, wherein said execution control means controls said instruction executing unit to await the execution of the decoded instruction until the TLB clear processing end notices are received from the other processors when it is determined that the decoded instruction is one of the instructions requiring to update the TLBs of the plurality of processors.

19. In a multiprocessor system including a main memory and a plurality of processors, each of which includes a translation lookaside buffer (TLB), a TLB clear control system comprising:

decoding means for sequentially decoding instructions;

an instruction executing unit;

TLB clearing means for clearing said TLB in response to a TLB clear command;

communication means for communicating with the other processors;

request storage means for storing TLB clear requests transmitted from the other processors and received by said communication means;

storage managing means for generating a storage state data indicating whether any TLB clear request is present in said request storage means, for reading out the TLB clear request from said request storage means in response to a read command, and for clearing said request storage means in response to a storage clear command;

determining means for determining whether or not the decoded instruction is one of the instructions requiring to clear or update the TLBs of the plurality of processors or refer to the TLB of the requesting processor; and execution control means for controlling said instruction executing unit to execute the decoded instruction when it is determined by said determining means that there is no TLB clear request in the request storage means, or that the decoded instruction is not one of the instructions requiring to clear or update the TLBs or refer to the TLB and that any TLB clear request is present in the request storage means, for issuing the read command to said storage managing means and the TLB clear command to said TLB clearing means to perform a TLB clear processing corresponding to the TLB clear request present in said request storage means when it is determined from the storage state data that any TLB clear request from the other processors is present in the request storage means, and when it is determined by said determining means that the decoded instruction is one of the instructions requiring to clear or update the TLBs or refer to the TLB, and for controlling said communication means to transmit a TLB clear processing end notice to one of the plurality of processors requesting the TLB clear request after performing the processing.

20. In a multiprocessor system including a main memory and a plurality of processors, each of which includes a translation lookaside buffer (TLB), a TLB clear control system comprising:

decoding means for sequentially decoding instructions;

an instruction executing unit;

TLB clearing means for clearing said TLB in response to a TLB clear command;

communication means for communicating with the other processors;

request storage means for storing TLB clear requests transmitted from the other processors and received by said communication means;

storage managing means for generating a storage state data indicating whether any TLB clear request is present in said request storage means, for reading out the TLB clear request from said request storage means in response to a read command, and for clearing said request storage means in response to a storage clear command;

determining means for determining whether or not the decoded instruction is one of the instructions requiring to clear or update the TLBS of the plurality of processors; and execution control means for issuing the TLB clear command to said TLB clearing means when the storage state data indicates that no TLB clear request from the other processors is present in said request storage means and when it is determined by said determining means that the decoded instruction is any one of the instructions requiring to clear or update the TLBs, for controlling said communication means to issue a TLB clear request to the other processors, and for controlling said decoding means to decode a next instruction after issuing the TLB clear command when it is determined by said determining means that the decoded instruction is any one of the instructions requiring only to clear the TLBs.

* * * * *